(12) United States Patent
Deneuville

(10) Patent No.: US 12,669,377 B2
(45) Date of Patent: Jun. 30, 2026

(54) SYSTEM FOR MEASURING AN ESTIMATED DEGREE OF LINEAR POLARIZATION OF AN ELECTROMAGNETIC RADIATION REFLECTED BY A SCENE

(71) Applicant: Commissariat à l'Énergie Atomique et aux Énergies Alternatives, Paris (FR)

(72) Inventor: François Deneuville, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 79 days.

(21) Appl. No.: 18/336,452

(22) Filed: Jun. 16, 2023

(65) Prior Publication Data

US 2023/0417598 A1 Dec. 28, 2023

(30) Foreign Application Priority Data

Jun. 22, 2022 (FR) ....................................... 2206124

(51) Int. Cl.
*G01J 4/04* (2006.01)
*G01J 3/02* (2006.01)

(52) U.S. Cl.
CPC ............... *G01J 4/04* (2013.01); *G01J 3/0208* (2013.01); *G01J 3/0224* (2013.01)

(58) Field of Classification Search
CPC .......... G01J 4/04; G01J 3/0208; G01J 3/0224; G01J 4/00; G01N 21/21
See application file for complete search history.

(56) References Cited

U.S. PATENT DOCUMENTS 6,239,873 B1 * 5/2001 Videen .................. G01N 21/21 356/369
7,339,670 B2 * 3/2008 Carrig .................... G01S 7/499 356/342

(Continued)

FOREIGN PATENT DOCUMENTS

EP 3 503 192 A1 6/2019
WO WO 2005/029015 A2 3/2005
WO WO 2021/231112 A1 11/2021

OTHER PUBLICATIONS

Preliminary Search Report for French Application No. 2206124, dated Jan. 27, 2023.

(Continued)

*Primary Examiner* — Tarifur R Chowdhury
*Assistant Examiner* — Mohamed Doumbia
(74) *Attorney, Agent, or Firm* — Wolf, Greenfield & Sacks, P.C.

(57) ABSTRACT

A system for determining an estimated degree of polarization of a radiation reflected) by a scene, including a first light source of a first electromagnetic radiation at a first frequency and rectilinearly polarized according to a first direction, a second light source of a second electromagnetic radiation at a second frequency greater than the first frequency and rectilinearly polarized according to a second direction non-parallel to the first direction, and a device of acquisition of an image of the radiation reflected by the scene including first pixels configured to capture the reflected radiation, each first pixel being covered with a rectilinear polarizer according to a third direction non-perpendicular to the first direction.

11 Claims, 6 Drawing Sheets

(56) References Cited

U.S. PATENT DOCUMENTS

| | | | | |
|---|---|---|---|---|
| 2005/0264813 | A1* | 12/2005 | Giakos | G01J 3/447 356/369 |
| 2011/0051118 | A1 | 3/2011 | Sato et al. | |
| 2015/0211928 | A1* | 7/2015 | Itoh | G01J 3/32 356/402 |
| 2016/0216198 | A1* | 7/2016 | Sun | G01N 21/538 |
| 2018/0195965 | A1* | 7/2018 | Carron | G01N 21/65 |
| 2019/0191067 | A1* | 6/2019 | Vaillant | H01L 27/1469 |
| 2021/0057474 | A1 | 2/2021 | Yamazaki | |

OTHER PUBLICATIONS

[No Author Listed], Wikipedia: Battement (acoustique). Oct. 31, 2021, XP093273897; 3 pages.

* cited by examiner

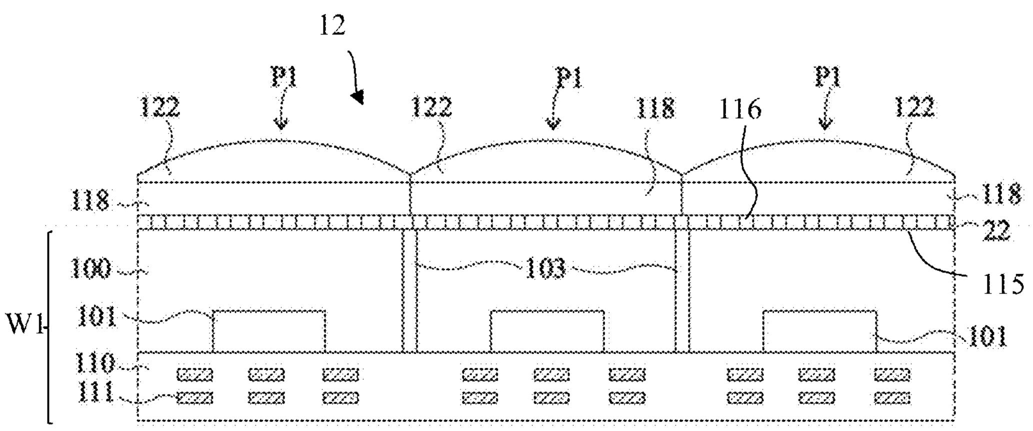
Fig 6
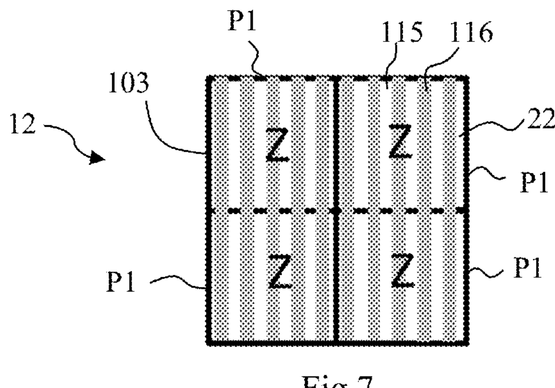
Fig 7
Vdd
300
304
306
Vres
314
Vmem1
Vsn1
VresPD
308
310
Vdd
318
302
mem1
SN
PD
Vsel
312
316
Fig 8

SYSTEM FOR MEASURING AN ESTIMATED DEGREE OF LINEAR POLARIZATION OF AN ELECTROMAGNETIC RADIATION REFLECTED BY A SCENE

The present patent application claims the priority benefit of French patent application FR22/06124, which is herein incorporated by reference as authorized by law.

TECHNICAL BACKGROUND

The present application concerns the field of devices for determining the degree of polarization of an electromagnetic radiation.

PRIOR ART

An electromagnetic radiation may be completely polarized, partially polarized, or completely non-polarized. A partially polarized radiation can be described as the sum of a polarized radiation and of a completely non-polarized radiation. The degree of polarization DOP is the ratio of the power of the polarized signal to the total power of the electromagnetic radiation, and corresponds to a number varying from 0 to 1.

A polarized electromagnetic radiation may, totally or partly, lose its coherence and thus become depolarized by reflecting on a scene, particularly according to the surface conditions or the materials forming the elements of the scene. Similarly, a non-polarized electromagnetic radiation may, totally or partly, polarize by reflecting on a scene, particularly according to the surface conditions or the materials forming the elements of the scene.

An image of the degree of polarization DOP of the radiation reflected by a scene can thus be used to determine certain characteristics of the elements of the scene, particularly the surface condition or properties of the materials present at the surface of the elements of the scene.

A system for determining an image of the degree of polarization DOP of a reflected radiation may comprise a light source emitting towards the scene a radiation rectilinearly polarized according to a given direction, and a sensor of the reflected radiation having each pixel covered with a rectilinear polarizer.

A disadvantage of such a system is that it requires the use of rectilinear polarizers according to different directions, for example, parallel to the given direction, perpendicular to the given direction, inclined by +45° with respect to the given direction, etc. The forming of different types of rectilinear polarizers on the sensor may be complex, all the more as the current tendency is to decrease the pixel dimensions.

SUMMARY OF THE INVENTION

An object of an embodiment is to provide a system for determining an image of the degree of polarization overcoming all or part of the disadvantages of existing electronic devices.

An embodiment provides a system for determining an estimated degree of polarization of a radiation reflected by a scene, comprising:

- a first light source of a first electromagnetic radiation at a first frequency and rectilinearly polarized according to a first direction;
- a second light source of a second electromagnetic radiation at a second frequency greater than the first frequency and rectilinearly polarized according to a second direction non-parallel to the first direction; and
- a device for acquiring an image of the radiation reflected by the scene comprising first pixels configured to capture the reflected radiation, each first pixel being covered with a rectilinear polarizer according to a third direction non-perpendicular to the first direction.

According to an embodiment, the third direction is identical to the first direction.

According to an embodiment, the second frequency is a multiple of the first frequency.

According to an embodiment, the second frequency is twice the first frequency.

According to an embodiment, the first frequency is in the range from 25 MHz to 100 MHz.

According to an embodiment, the second direction is perpendicular to the first direction.

According to an embodiment, the acquisition device comprises no other rectilinear polarizers than the rectilinear polarizers according to the third direction.

According to an embodiment, the acquisition device is further configured to provide a depth image of the scene.

According to an embodiment, the acquisition device is further configured for the acquisition of a 2D image of the scene and comprises second 2D image pixels.

According to an embodiment, the acquisition device comprises a stack of a first sensor comprising the second pixels and of a second sensor comprising the first pixels.

An embodiment also provides a method of determining an estimated degree of polarization of a radiation reflected by a scene, comprising the following steps:

- emission by a first light source of a first electromagnetic radiation at a first frequency and rectilinearly polarized according to a first direction;
- emission by a second light source of a second electromagnetic radiation at a second frequency greater than the first frequency and rectilinearly polarized according to a second direction non-parallel to the first direction; and
- acquisition by an acquisition device of an image of the radiation reflected by the scene, the acquisition device comprising first pixels configured to capture the reflected radiation, each first pixel being covered with a rectilinear polarizer according to the first direction.

According to an embodiment, the second frequency is equal to twice the first frequency, the method further comprising the following steps:

- the acquisition by the first pixels of $N_{tap}$ samples $I_k$ of charges photogenerated by detection of the reflected radiation during shifted time periods $T_{int}$, $N_{tap}$ being an integer number greater than or equal to five;
- the determination of coefficients $a_n$ and $b_n$, n being an integer number varying from 1 to 2, according to the following relations:

$$\begin{cases} a_n = \dfrac{2}{N_{tap}} \dfrac{1}{\operatorname{sinc}\left(\frac{1}{2}n\omega\right)T_{int}} \displaystyle\sum_{k=0}^{N_{tap}-1} I_k \cos(n\omega k T_e) \\ b_n = \dfrac{2}{N_{tap}} \dfrac{1}{\operatorname{sinc}\left(\frac{1}{2}n\omega\right)T_{int}} \displaystyle\sum_{k=0}^{N_{tap}-1} I_k \sin(n\omega k T_e) \end{cases} \quad \text{[Math 1]}$$

where ω is the pulse associated with the first frequency;

- the determination of coefficients $c_n$ according to the following relation:

$$c_n=\sqrt{a_n^2+b_n^2}$$ [Math 2]

the determination of the estimated degree of polarization DOP' according to the following relation:

$$DOP'=\frac{c_1-c_2}{c_1+c_2}.$$ [Math 3]

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which:

FIG. 6 is a partial and simplified cross-section view, illustrating an embodiment of an image acquisition device of the system of FIG. 1;

FIG. 7 is a simplified top view showing an example of arrangement of the pixels of the image acquisition device of FIG. 6;

FIG. 8 schematically shows an embodiment of a circuit of a pixel of the image acquisition device of FIG. 6;

DESCRIPTION OF THE EMBODIMENTS

Figure 1:
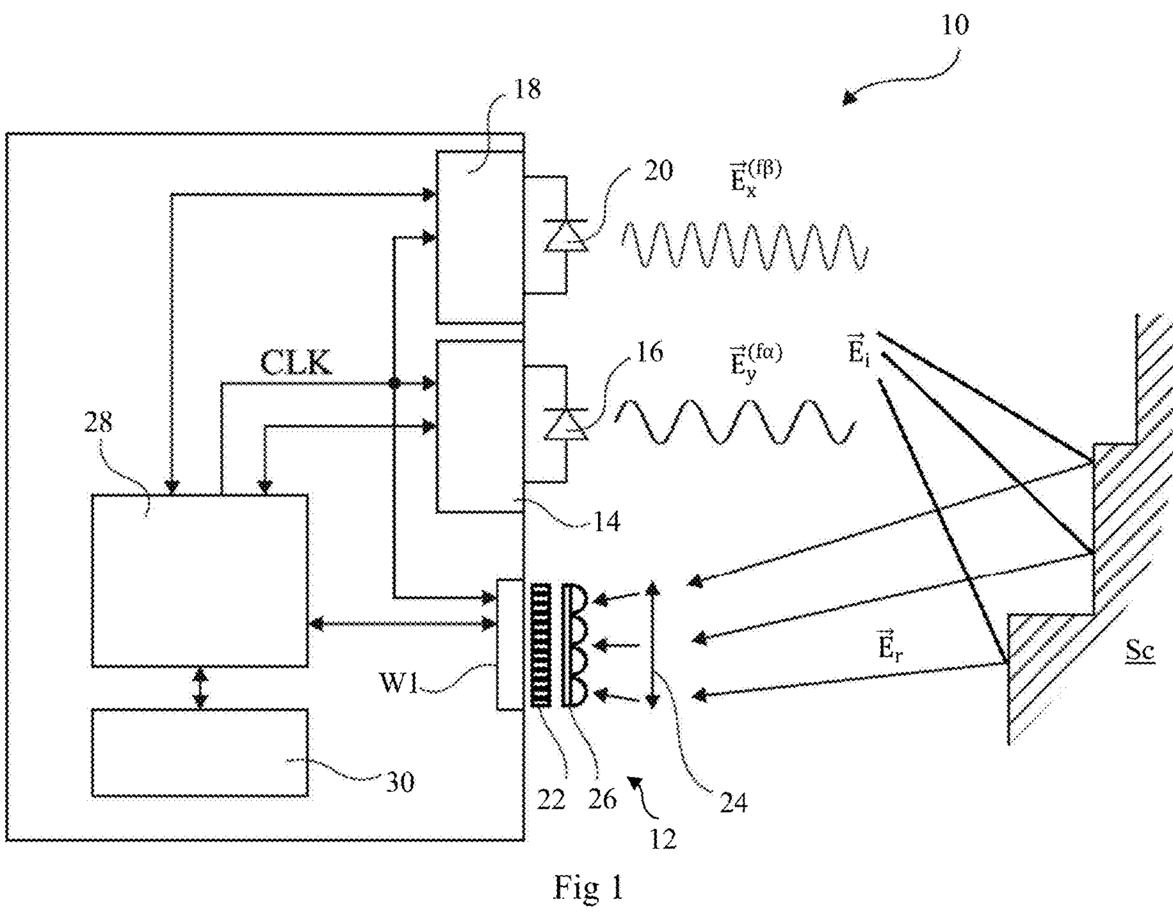
FIG. 1 schematically shows an embodiment of a system for determining the estimated degree of polarization of an electromagnetic radiation.

Like features have been designated by like references in the various figures. In particular, the structural and/or functional features that are common among the various embodiments may have the same references and may dispose identical structural, dimensional and material properties. For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements. Further, it is considered herein that the terms "insulating" and "conductive" respectively signify "electrically-insulating" and "electrically-conductive".

The expressions "about", "approximately", "substantially", and "in the order of" signify plus or minus 10%, preferably of plus or minus 5%. Unless specified otherwise, ordinal numeral adjectives, such as "first", "second", etc., are only used to distinguish elements from one another. In particular, these adjectives do not limit the described embodiments to a specific order of these elements.

Generally, an electromagnetic radiation can be broken down into a complex component $E_x$ along a first direction $\vec{x}$ and a complex component $E_y$ along second direction $\vec{y}$. The polarization state of the electromagnetic radiation may be represented by Stokes vector $[S_0, S_1, S_2, S_3]^T$. Parameter $S_0$ corresponds to the total measured intensity of the electromagnetic radiation, which is positive. Parameter $S_3$ corresponds to the circular polarization intensity, which may be positive or negative according to the rotation direction. Sum $S_1+iS_2$ corresponds to the rectilinear polarization intensity, a complex number which accounts for the inclination θ of the polarization direction. Stokes vector $[S_0, S_1, S_2, S_3]^T$ can be defined according to the following relation Math 4:

$$\begin{bmatrix} S_0 \\ S_1 \\ S_2 \\ S_3 \end{bmatrix} = \begin{bmatrix} |E_x|^2+|E_y|^2 \\ |E_x|^2\text{-}|E_y|^2 \\ 2\mathrm{Re}(E_xE_y^*) \\ 2\mathrm{Im}(E_xE_y^*) \end{bmatrix}$$ [Math 4]

where the two vertical bars || designate the amplitude, asterisk * designates the complex conjugate, Re designate the real part of a complex number, and Im designates the imaginary part of a complex number.

An electromagnetic radiation may be completely polarized, partially polarized, or completely non-polarized. A partially polarized radiation can be described as the sum of a polarized radiation and of a completely non-polarized radiation. The degree of polarization DOP, also called polarization rate, is the ratio of the power of the polarized signal $I_{pol}$ to the total power $I_{tot}$, that can thus be written with the Stokes parameters according to the following relation Math 5:

$$DOP = \frac{I_{pol}}{I_{tot}} = \frac{\sqrt{S_1^2 + S_2^2 + S_3^2}}{S_0} \quad \text{[Math 5]}$$

FIG. 1 schematically shows an embodiment of a system 10 for determining the degree of polarization of an electromagnetic radiation comprising an image acquisition device 12.

System 10 comprises a first light signal emission circuit 14 which drives a first light source 16, for example, a light-emitting diode. First light source 16 emits a first electromagnetic wave $$\vec{E}_y^{(f\alpha)}.$$

The first electromagnetic wave is a wave at a first frequency fα, rectilinearly polarized according to a first direction $\vec{y}$. The first electromagnetic wave is at a wavelength in the near-infrared spectrum, for example in the range from 700 nm to 2,000 nm, for example, around 940 nm, around 1,100 nm, or around 1,400 nm, which are the wavelengths which do not appear in the solar spectrum since they are absorbed by the atmosphere. A rectilinear polarizer, not shown, may be associated with the first light source 16 to ensure the rectilinear polarization of the first electromagnetic wave $$\vec{E}_y^{(f\alpha)}$$

according to first direction $\vec{y}$.

System 10 comprises a second light signal emission circuit 18 which drives a second light source 20, for example, a light-emitting diode. Second light source 20 emits a second electromagnetic wave $$\vec{E}_x^{(f\beta)}.$$

The second electromagnetic wave is a wave at a second frequency fβ, rectilineary polarized according to a second direction $\vec{x}$. According to an embodiment, first direction $\vec{y}$ is perpendicular to second direction $\vec{x}$. The second electromagnetic wave is at a wavelength in the near-infrared spectrum, for example, in the range from 700 nm to 2,000 nm, for example around 940 nm, around 1,100 nm, or around 1,400 nm, which are the wavelengths which do not appear in the solar spectrum since they are absorbed by the atmosphere. A rectilinear polarizer, not shown, may be associated with second light source 20 to ensure the rectilinear polarization of the second electromagnetic wave $$\vec{E}_x^{(f\beta)}$$

according to second direction $\vec{x}$.

According to an embodiment, the first and second electromagnetic waves $\vec{E}_y^{(f\alpha)}$ and $$\vec{E}_y^{(f\alpha)} \text{ and } \vec{E}_x^{(f\beta)}$$

are simultaneously emitted. According to another embodiment, the first and second electromagnetic waves $$\vec{E}_y^{(f\alpha)} \text{ and } \vec{E}_x^{(f\beta)}$$

are successively emitted. According to another embodiment, first light source 16 is configured to emit a first structured light and second light source 20 is configured to emit a second structured light. In this case, the first and second structured lights are successively emitted.

In practice, light sources 16 and 20 emit light at a determined wavelength or in a determined wavelength range, preferably a narrow wavelength range, for example a range having a width at half-maximum smaller than 3 nm, for example, for light source 16, a source of central emission wavelength in the order of 940 nm.

The first electromagnetic wave and the second electromagnetic wave are for example emitted via one or a plurality of lenses (not shown in FIG. 1). According to an embodiment, second frequency fβ is equal to a multiple M of first frequency fα, M being an integer number greater than or equal to 2. According to an embodiment, M is equal to 2 and the second frequency fβ is equal to twice the first frequency fα.

Light signal $\vec{E}_i$ comprising the first electromagnetic wave and the second electromagnetic wave is emitted towards a scene Sc.

Image acquisition device 12 comprises an image sensor W1 and a rectilinear polarizer 22 oriented according to first direction $\vec{x}$. The light of the light signal $\vec{E}_r$ reflected from the scene is captured by sensor W1 via rectilinear polarizer 22. Image sensor W1 for example comprises a plurality of pixels, called Z pixels hereafter, capable of receiving the light signal reflected by scene Sc, and used for the determination of an estimate of the degree of polarization of the light signal reflected by scene Sc. Image acquisition device 12 may further comprise an optical system, for example between rectilinear polarizer 22 and the scene, for example comprising an imaging lens 24 and an array of microlenses 26, which focuses the light onto the individual pixels of sensor W1.

A processor 28 of system 10 is for example coupled to image acquisition device 12 and to the light signal emission circuits 14 and 18 and determines, based on the signals captured by the pixels of image acquisition device 12, for each pixel, an estimated degree of polarization of the light signal captured by the pixel. The image of the estimated degree of polarization generated by processor 28 is for example stored in a memory 30 of system 10.

The first electromagnetic wave $$\vec{E}_y^{(f\alpha)}$$

emitted by first light source 16 may correspond to a sine wave and can then be written according to the following relation Math 6:

$$\vec{E}_y^{(f\alpha)} = E_{y0}\cos(2\pi f\alpha t + \phi_{\alpha 0})\vec{y} = E_y^{(f\alpha)}\vec{y} \quad \text{[Math 6]}$$

The second electromagnetic wave $$\vec{E}_x^{(f\beta)}$$

emitted by second light source 20 may correspond to a sine wave and can then be written according to the following relation Math 7:

$$\vec{E}_x^{(f\beta)} = E_{x0}\cos(2\pi f\beta t + \phi_{\beta 0})\vec{x} = E_x^{(f\beta)}\vec{x} \quad \text{[Math 7]}$$

The light signal $\vec{E}_i$ emitted towards scene Sc is provided by the following relation Math 8:

$$\vec{E}_i = E_x^{(f\beta)}\vec{x} + E_y^{(f\alpha)}\vec{y} \quad \text{[Math 8]}$$

The light signal reflected by the scene $\vec{E}_r$ is modeled by the following relation Math 9:

$$\vec{E}_r = \left(r_x E_x^{(f\beta)} + \frac{\sqrt{2}\,d}{2}E_x^{(f\beta)} + \frac{\sqrt{2}\,d}{2}E_y^{(f\alpha)}\right)\vec{x} + \left(r_y E_y^{(f\alpha)} + \frac{\sqrt{2}\,d}{2}E_y^{(f\alpha)} + \frac{\sqrt{2}\,d}{2}E_x^{(f\beta)}\right)\vec{y} \quad \text{[Math 9]}$$

where $r_x$ corresponds to the optical reflectivity along direction $\vec{x}$, $r_y$ corresponds to the optical reflectivity along direction $\vec{y}$, and d corresponds to the diffuse reflectivity.

After the passage through polarizer 22, only the component along direction $\vec{x}$ is kept so that the light signal reaching each pixel Z has an amplitude $E_{ph}$ given by the following relation Math 10:

$$E_{ph} = r_x E_{x0} + \frac{\sqrt{2}\,d}{2}E_{x0} + \frac{\sqrt{2}\,d}{2}E_{y0} \quad \text{[Math 10]}$$

The light intensity $I_{ph}(t)$ reaching each pixel Z is given by the following relation Math 11:

$$I_{ph}(t) = RI_{x0}^{(f\beta)}(t) + \frac{D}{2}I_{x0}^{(f\beta)}(t) + \frac{D}{2}I_{y0}^{(f\alpha)}(t) \quad \text{[Math 11]}$$

where R is equal to $r_x^2$ and D is equal to $d^2$.

Calling ω the pulse corresponding to frequency fα and reminding that fβ is equal to M times fα, the light intensity $I_{ph}(t)$ reaching each pixel Z can also be written according to the following relation Math 12:

$$I_{ph}(t) = c_\alpha\sin(\omega t + \phi_\alpha) + c_\beta\sin(M\omega t + \phi_\beta) = a_\alpha\cos(\omega t) + b_\alpha\sin(\omega t) + a_\beta\cos(M\omega t) + b_\beta\sin(M\omega t) \quad \text{[Math 12]}$$

Figure 2:
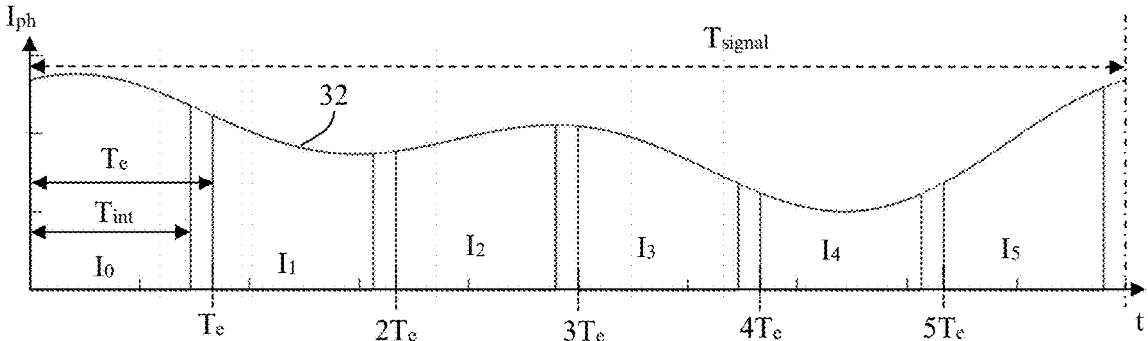
FIG. 2 is a graph illustrating an example of light intensity of an electromagnetic radiation reflected by a scene received by the system of FIG. 1.

FIG. 2 shows an example of a curve 32 of variation, over time t, of the light intensity $I_{ph}(t)$ of the light signal received by one of the pixels of image acquisition device 12 in the case where frequency $f_\beta$ is twice frequency $f_\alpha$. It is a pseudo-periodic signal of period $T_{signal}$.

The signal captured by each pixel Z is sampled to provide a number $N_{tap}$ of samples $I_k$, where $N_{tap}$ is an integer number greater than or equal to 5 and k is an integer number varying from 0 to $N_{tap}-1$. Each sample $I_k$ can be written according to the following relation Math 13:

$$I_k = \frac{1}{T_{int}}\cdot\int_{kT_e-\frac{1}{2}T_{int}}^{kT_e+\frac{1}{2}T_{int}} I_{ph}(t)\,dt \quad \text{[Math 13]}$$

where $T_{int}$ is the integration time period for each of samples $I_k$ and $T_e$ is the time period separating the beginnings of two successive integrations. Each sample corresponds to a portion of the area under curve 32. As an example, six samples $I_0$, $I_1$, $I_2$, $I_3$, $I_4$, and $I_5$ are illustrated in FIG. 2.

Each sample $I_k$ is for example integrated over a large number of periods $T_{signal}$ for example, over approximately 100,000 periods, or more generally from 10,000 to 10 millions of periods. Each sampling window for example has a duration $T_{int}$ ranging up to one quarter of the period of the light signal. In the example of FIG. 2, each sampling window is of a same duration $T_{int}$. There may or not be a time interval separating a sampling window from the next one and, in certain cases, there may be an overlapping between sampling windows. Each sampling window for example has a duration $T_{int}$ in the range from 10% to 30% of the period $T_{signal}$ of the light signal in the case of a pixel capturing six samples per period $T_{signal}$.

Coefficients $a_\alpha$, $a_\beta$, $b_\alpha$, and $b_\beta$ are given by the following relations Math 14:

$$\begin{cases} a_\alpha = \dfrac{2}{N_{tap}}\dfrac{1}{\mathrm{sinc}\left(\frac{1}{2}\omega T_{int}\right)}\displaystyle\sum_{k=0}^{N_{tap}-1} I_k\cos(\omega k T_e) \\ b_\alpha = \dfrac{2}{N_{tap}}\dfrac{1}{\mathrm{sinc}\left(\frac{1}{2}\omega T_{int}\right)}\displaystyle\sum_{k=0}^{N_{tap}-1} I_k\sin(\omega k T_e) \end{cases} \quad \text{[Math 14]}$$

$$\begin{cases} a_\beta = \dfrac{2}{N_{tap}}\dfrac{1}{\mathrm{sinc}\left(\frac{1}{2}M_\omega T_{int}\right)}\displaystyle\sum_{k=0}^{N_{tap}-1} I_k\cos(M_\omega k T_e) \\ b_\beta = \dfrac{2}{N_{tap}}\dfrac{1}{\mathrm{sinc}\left(\frac{1}{2}M_\omega T_{int}\right)}\displaystyle\sum_{k=0}^{N_{tap}-1} I_k\sin(M_\omega k T_e) \end{cases}$$

According to an embodiment, to determine coefficients $a_\alpha$, $b_\alpha$, $a_\beta$, $b_\beta$, the received light signal is sampled by transferring, successively and at a regular interval, charges photogenerated in a Z pixel during the sampling window of the first sample $I_0$, charges photogenerated in the same Z pixel or another Z pixel during the sampling window of the second sample $I_1$, charges photogenerated in the same Z pixel or another Z pixel during the sampling window of the third sample $I_2$, charges photogenerated in the same Z pixel or another Z pixel during the sampling window of the fourth sample $I_3$, charges photogenerated in the same Z pixel or another Z pixel during the sampling window of the fifth sample $I_4$, and charges photogenerated in the same Z pixel or another Z pixel during the sampling window of the sixth sample $I_5$. These six transfers are repeated a large number of times, for example, 100,000 times before the obtained signals are read by the output circuit. According to another embodiment, a Z pixel may be configured to acquire charges photogenerated for only two or three samples during a same acquisition phase. In this case, two or three acquisition phases may be carried out to obtain all the samples.

Coefficients $c_\alpha$ and $c_\beta$ are given by the following relations Math 15:

$$\begin{cases} c_\alpha = \sqrt{a_\alpha^2 + b_\alpha^2} \\ c_\beta = \sqrt{a_\beta^2 + b_\beta^2} \end{cases} \quad \text{[Math 15]}$$

Coefficients $c_\alpha$ and $c_\beta$ may also be obtained from the previously-described relation Math 11 by separating the components at frequency $f_\alpha$ and the components at frequency $f_\beta$. The following relations Math 16 are then obtained:

$$\begin{cases} c_\beta = RI_{x0}^{(f\beta)} + \frac{D}{2} I_{x0}^{(f\beta)} \\ c_\alpha = \frac{D}{2} I_{y0}^{(f\alpha)} \end{cases} \quad \text{[Math 16]}$$

The ratio between light intensities $$I_{x0}^{(f\beta)} \text{ and } I_{y0}^{(f\alpha)}$$

is known. As an example, if it is considered that light sources 16 and 22 emit light signals of same intensities, intensity $$I_{x0}^{(f\beta)}$$

is equal to intensity $$I_{y0}^{(f\alpha)},$$

and the following equality Math 17 is obtained:

$$\frac{c_\beta - c_\alpha}{c_\alpha + c_\beta} = \frac{R}{R + D} \quad \text{[Math 17]}$$

An estimate of the degree of polarization DOP' of the radiation reaching pixel Z, called estimated degree of polarization hereafter, is taken as equal to this ratio according to the following relation Math 18:

$$DOP' = \frac{c_\beta - c_\alpha}{c_\beta + c_\alpha} \quad \text{[Math 18]}$$

The number of samples $N_{tap}$ used particularly depends on the desired accuracy. The larger the number of samples $N_{tap}$ used, the larger the acceptable noise level.

Figure 3:
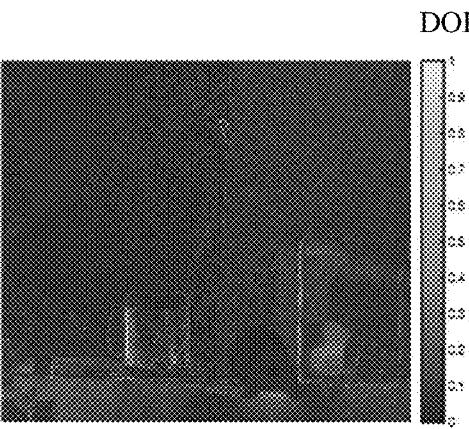
FIG. 3 is a grey-scale image of the degree of polarization of the radiation reflected by a scene illuminated by a non-polarized radiation.

FIG. 3 is a grey-scale image of the degree of polarization DOP of the radiation reflected by a scene illuminated by non-polarized light. The DOP of a non-polarized planar electromagnetic wave is equal to 0 and the DOP of a polarized planar electromagnetic wave is equal to 1. As shown in the drawing, the degree of polarization DOP of the radiation reflected by the scene is null or low over the most part of the image, which signifies that the reflected radiation is mostly non-polarized. Only the reflections on certain portions of the scene tend to locally polarize the reflected radiation.

Figure 4:
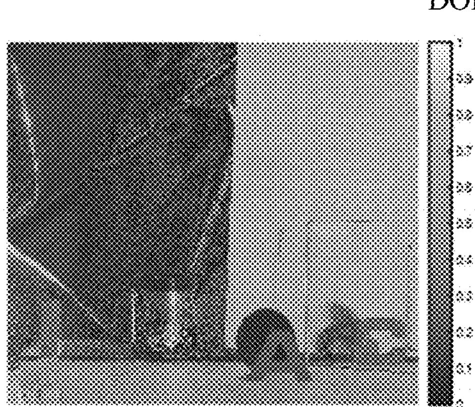
FIG. 4 is a grey-scale image of the degree of polarization of the radiation reflected by the same scene as in FIG. 3 illuminated by a rectilinearly-polarized radiation.

FIG. 4 is a grey-scale image of the degree of polarization DOP of the radiation reflected by the same scene as in FIG. 3 illuminated by a rectilinearly-polarized light. As shown in this drawing, certain elements of the scene depolarize the reflected radiation, while other elements of the scene do not depolarize the reflected radiation.

Figure 5:
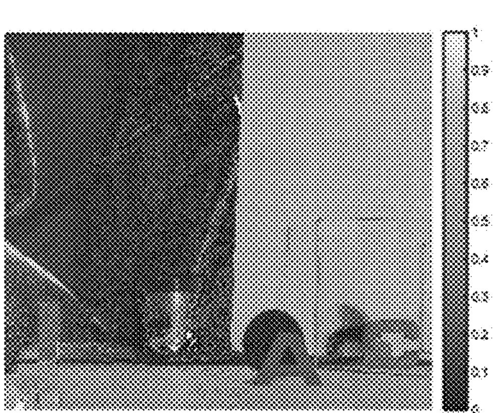
FIG. 5 is a grey-scale image of the estimated degree of polarization of the radiation reflected by the same scene as in FIG. 3 illuminated by two rectilinearly-polarized radiations.

FIG. 5 is a grey-scale image of the estimated degree of polarization DOP' of the radiation reflected by the same scene as in FIG. 3 obtained by the system 10 shown in FIG. 1. FIG. 5 is substantially identical to FIG. 4, which shows that the estimated degree of polarization DOP' is a relevant estimate of the degree of polarization DOP.

In the previously described embodiment, the light signals emitted by light sources 16 and 20 each have the shape of a sine wave. However, in alternative embodiments, the light signals emitted by light sources 16 and 20 might each have a different periodic shape, for example formed of a sum of sine waves having at least one distinct frequency per source, or square waves M corresponding to an even number.

In this case, the previously-described relation Math 12 is replaced with the following relation Math 19:

$$I_{ph}(t) = \sum_{n=1}^{N_{harmo}} c_n \sin(n\omega t + \phi_n) = \sum_{n=1}^{N_{harmo}} a_n \cos(n\omega t) + b_n \sin(n\omega t) \quad \text{[Math 19]}$$

where $N_{harmo}$ is equal to the considered number of harmonics.

According to an embodiment, only the first harmonic of each electromagnetic wave is used so that the previously-described relations Math 14 may be used to determine coefficients $a_\alpha$, $a_\beta$, $b_\alpha$, and $b_\beta$.

According to an embodiment, system 10 is further configured to determine a depth image. For this purpose, according to an embodiment, system 10 is further configured to detect the phase of the received signal to form a depth image. There is a phase shift $\Delta\phi_\beta$ between the emitted light signal and the received light signal, which represents the time of flight (ToF) of the first light signal originating from light-emitting diode 16 to image acquisition device 12 via an object of scene Sc which reflects the light signal. An estimate of the distance d to the object in scene Sc can thus be calculated by using the following equation Math 20:

$$d = \frac{c}{4\pi f\beta} \Delta\Phi_\beta \quad \text{[Math 20]}$$

where c designates the speed of light.

Similarly, an estimate of the distance d to the object in scene Sc can also be calculated by using the following equation Math 21:

$$d = \frac{c}{4\pi f\alpha}\Delta\Phi_\alpha \quad \text{[Math 21]}$$

if the captured signal is sufficient, to specify the distance of the most distant objects, that is, distances where d is greater than c/(2fβ), knowing that frequency fα is smaller than frequency fβ. The use of the electromagnetic wave at frequency fα for the determination of distance d may also enable to solve the 2*π phase jumps which appear by using the electromagnetic wave at frequency fβ for the objects most distant from scene Sc. For close objects, since the two electromagnetic waves emitted by sources 16 and 20 reflect on the same object and follow the same optical path, the distances determined by equations Math 20 and Math 21 are theoretically the same.

Phase shift $\Delta\phi_\beta$ is for example estimated based on a sampling of the signal captured by a Z pixel during at least three distinct sampling windows, preferably during four distinct sampling windows, during each period of the light signal. A technique based on the detection of four samples per period is described in further detail in R. Lange and P. Seitz's publication entitled "Solid-state TOF range camera", IEE J. on Quantum Electronics, vol. 37, No. 3, March 2001, which is herein incorporated by reference as authorized by law. The present embodiment is for example based on the detection of four samples per period.

Processor 20 determines, based on the signals captured by the Z pixels of image acquisition device 12, the corresponding distances of the objects in scene Sc. The depth image generated by processor 20 is for example stored in memory 22.

For the determination of the depth by using the phase shift, the timing of the sampling windows for the obtaining of samples $I_k$ is controlled to be synchronized with the timing of the first light signal emitted by source 16. For example, the light signal emission circuit 14 generates a light signal based on a clock signal CLK (FIG. 1), and image acquisition device 12 receives the same clock signal CLK to control the end time of each sampling window by for example using delay elements to introduce the appropriate phase shifts.

Based on the integrated samples $I_k$ of the light signal, and for a purely sine light wave, the phase shifts $\Delta\phi_\beta$ and $\Delta\phi_\alpha$ of the light signal can be determined by using the following relations Math 22:

$$\Delta\phi_\alpha = \phi_{\alpha 0} - \phi_\alpha \quad \text{[Math 22]}$$

$$\Delta\phi_\beta = \phi_{\beta 0} - \phi_\beta$$

$$\phi_\alpha = \tan^{-1}\frac{a_\alpha}{b_\alpha}$$

$$\phi_\beta = \tan^{-1}\frac{a_\beta}{b_\beta}$$

where phases $\phi_{\alpha 0}$ and $\phi_{\beta 0}$ are those defined by relations Math 6 and Math 7. Further, in the case where the number of samples $N_{tap}$ is equal to 4, and where a single electromagnetic wave at a frequency f is used, the following equation Math 23 is obtained:

$$\Delta\Phi = \arctan\left(\frac{I_3 - I_1}{I_0 - I_2}\right) \quad \text{[Math 23]}$$

According to the embodiment of determination of a depth image, the first and second electromagnetic waves $$\vec{E}_y^{(f\alpha)} \text{ and } \vec{E}_x^{(f\beta)}$$

are simultaneously emitted. According to another embodiment, the depth image is determined by direct time of flight (Direct ToF) detection. First light source 16 is then adapted to emitting light pulses towards scene Sc, and acquisition device 12 is configured to detect the returned light signal reflected by objects of the scene. By time of flight calculation of the light signal, the distance to the acquisition device of objects in the scene is determined. As an example, the pixels of acquisition device 12 may use SPAD-type (single-photon avalanche diode) photodiodes. In such an embodiment, the first and second electromagnetic waves $$\vec{E}_y^{(f\alpha)} \text{ and } \vec{E}_x^{(f\beta)}$$

may be successively emitted. In this case, waves $$\vec{E}_y^{(f\alpha)} \text{ and } \vec{E}_x^{(f\beta)}$$

are not modulated by frequencies fα and fβ. The waves are then noted $\vec{E}_y$ and $\vec{E}_x$.

FIG. 6 is a cross-section schematically and partially showing an embodiment of image acquisition device 12.

Image acquisition device 12 comprises sensor W1 formed inside and on top of a semiconductor substrate 100, for example, a single-crystal silicon substrate, sensor W1 comprising a plurality of pixels P1, each pixel P1 comprising a photodiode.

It should be noted that in the present disclosure, there is respectively meant by front surface and rear surface of an element, the surface of the element intended to face the scene, an image of which is desired to be acquired, and the surface of the element opposite to its front surface. In the embodiment of FIG. 6, the front and rear surfaces of image acquisition device 12 are respectively its upper surface and its lower surface.

In the shown embodiment, each pixel P1 of sensor W1 comprises a photodiode 101 comprising one or a plurality of local implanted regions, formed in semiconductor substrate 100. In this embodiment, the implanted region(s) of photodiode 101 are arranged on the rear surface side of substrate 100. Each pixel P1 may further comprise one or a plurality of additional components (not shown), for example, insulated-gate field effect transistors, also called MOS transistors, formed on the rear surface side of substrate 100, for example in substrate 100 and on the rear surface of substrate 100. Sensor W1 further comprises an interconnection stack 110, formed of alternated dielectric and conductive layers coating the rear surface of substrate 100, in which are formed conductive tracks and/or electronic connection terminals 111 connecting the pixels P1 of sensor W1 to a peripheral control and power supply circuit, not shown.

In the shown embodiment, sensor W1 comprises vertical insulation walls 103 crossing substrate 100 across its entire thickness and delimiting the substrate portions respectively corresponding to the pixels of sensor W1. Vertical insulation walls 103 particularly have an optical insulation function, and may further have an electrical insulation function. As an example, vertical insulation walls 103 are made of a dielectric material, for example, silicon oxide. As a variant, insulating walls 103 may not be present.

The thickness of substrate 100 is for example in the range from 2 μm to 10 μm, for example, from 3 μm to 5 μm.

As an example, in top view, the largest dimension of each pixel P1 of sensor W1 is smaller than 10 μm, for example, smaller than 5 μm, for example, smaller than 2 μm, for example, in the order of 1 μm.

In the shown embodiment, the front surface of substrate 100 is coated with rectilinear polarizer 22. Each pixel P1 used for the determination of the DOP' is covered with a rectilinear polarizer 22. Each rectilinear polarizer 22 may comprise a layer 115 of a first material, having strips 116 of a second material extending therein, strips 116 extending parallel to first direction $\vec{x}$. The first material is for example silicon oxide or air. The second material is of example silicon or a metal, particularly aluminum, copper, or tungsten. The width of each strip 116 may vary from 50 nm to 150 nm. The spacing between two adjacent strips may vary from 50 nm to 150 nm. The thickness of polarizer 22 may vary from 100 nm to 300 nm. Rectilinear polarizer 22 may further comprise an antireflection layer. As an example, layer 115 is arranged on top of and in contact with the front surface of substrate 100.

In the present embodiment, all the pixels P1 of sensor W1 are used for the determination of the estimated degree of polarization so that polarizer 22 can cover all the pixels P1. The manufacturing of polarizer 22 is then simplified.

FIG. 7 is a top view of device 12 where only the vertical insulation walls 103 delimiting four adjacent pixels P1 and polarizer 22 have been shown.

In the embodiment of FIG. 6, each pixel P1 comprises a filter 118, for example, a black resin layer or an interference filter, arranged on the front surface side of substrate 100, for example, on top of and in contact with the front surface of polarizer 22, in front of the photodiode 101 of the pixel. Each filter 118 is adapted to transmitting light in the emission wavelength range of light sources 16 and 20. Preferably, filter 118 is adapted to transmitting light only in a relatively narrow wavelength range centered on the emission wavelength range of light sources 16 and 20, for example, a wavelength range having a width at half-maximum smaller than 30 nm, for example, smaller than 20 nm, for example, smaller than 10 nm. Filter 118 enables to avoid an unwanted generation of charges carriers in the photodiode of the underlying pixels P1 under the effect of a light radiation which does not originate from light sources 16 and 20. In the present embodiment, all the pixels P1 of sensor W1 are used for the determination of the estimated degree of polarization so that filters 118 may correspond to a single filter which covers all the pixels P1. The manufacturing of filter 118 is then simplified.

Each pixel P1 of sensor W1 may further comprise a microlens 122 arranged on the front surface side of substrate 100, for example, on top of and in contact with the pixel filter 118, adapted to focusing the incident light onto the photodiode 101 of pixel P1. As a variant, filter 118 may not be integrated to pixel P1, but may be formed by a filter external to pixel P1. Filter 118 is then not present or replaced with a transparent layer, for example, made of the same material as that of microlenses 122.

FIG. 8 is a circuit diagram illustrating an embodiment of a circuit 300 of a pixel P1.

Circuit 300 is capable of performing a charge storage. Circuit 300 comprises a photosensitive element PD coupled between a node 302 and a reference power source, for example, the ground, the photosensitive element for example being the photodiode 101 of FIG. 6. Node 302 is coupled to a sense node SN via a sampling circuit 304. Sampling circuit 304 comprises a memory $mem_1$ coupled to node 302 by a transfer gate 306 which is for example an n-channel MOS transistor. Memory $mem_1$ is also coupled to sense node SN by an additional transfer gate 308, which is also for example an n-channel MOS transistor. Transfer gate 306 is controlled by a signal $Vmem_1$ applied to its control node, and transfer gate 308 is controlled by a signal $Vsn_1$ applied to its control node. Memory $mem_1$ provides a charge storage area where a charge transferred from photosensitive element PD is temporarily stored.

Circuit 300 further comprises an output circuit formed of a follower source transistor 310, of a selection transistor 312, and of a reset transistor 314, these transistors being for example n-channel MOS transistors. Sense node SN is coupled to the control node of transistor 310, which has for example its drain coupled to power supply voltage source Vdd, and its source coupled to an output line 316 of pixel circuit 300 by transistor 312, which is controlled by a signal Vsel applied to its gate. Sense node SN is also coupled to power supply voltage source Vdd through transistor 314, which is controlled by a signal Vres applied to its gate. In alternative embodiments, the output circuit could be shared by a plurality of pixels, sense node SN being for example coupled to the sampling circuit of one or a plurality of adjacent pixels.

Circuit 300 further comprises, for example, a transistor 318 coupling node 302 to power supply voltage source Vdd and enabling photodiode PD to be reset. Transistor 318 is for example controlled by a signal $Vres_{PD}$. It thus enables to control the exposure time by ensuring a discharge of photodiode PD before a beginning of synchronous integration for all the photodiodes PD of the sensor and to ensure an anti-blooming function to avoid an overflow of the photodiode into memories $mem_1$ during the general reading of the array.

According to an embodiment, image acquisition device 12 further allows the acquisition of an image in visible light, called 2D image hereafter. For this purpose, some of the photodetectors 101 of sensor W1 are adapted to capturing a radiation in visible light. The pixels P1 of sensor W1 capturing the visible light are called 2D pixels hereafter. A pixel of an image corresponds to the unit element of the image displayed by a display screen. For the acquisition of color images, sensor W1 generally comprises for the acquisition of each pixel of an image at least three pixels 2D, which each capture a light radiation substantially in a single color (for example, red, green, and blue).

Figure 9:
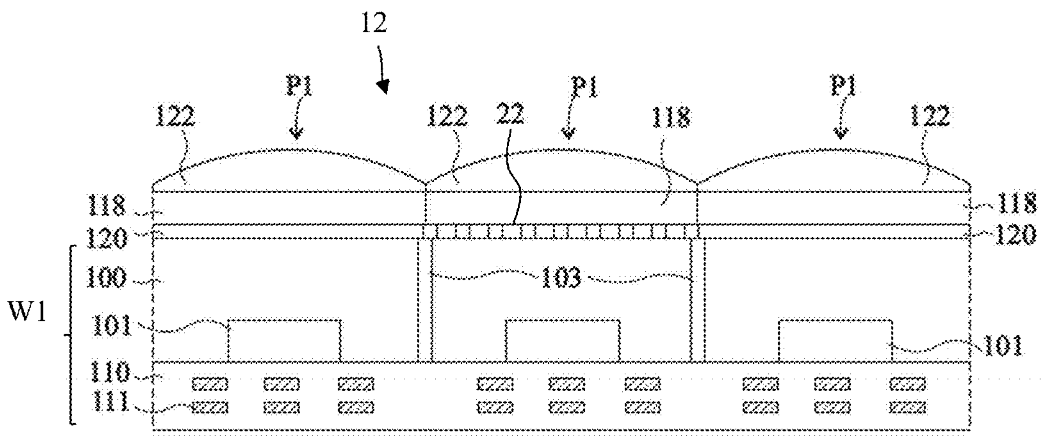
FIG. 9 is a partial and simplified cross-section view illustrating another embodiment of an image acquisition device of the system of FIG. 1 comprising 2D pixels and Z pixels.

FIG. 9 is a cross-section view schematically and partially illustrating another embodiment of image acquisition device 12 comprising Z pixels and 2D pixels. The image acquisition device 12 shown in FIG. 9 comprises all the elements of the image acquisition device 12 shown in FIG. 6, with the difference that certain pixels P1 are Z pixels used for the determination of the estimated degree of polarization and that other pixels P1 are 2D pixels. Polarizer 22 is only present on the Z pixels and is not present on the 2D pixels. Further, filters 118 covering 2D pixels may correspond to colored filters. Further, each 2D pixel may be covered with a filter 120 blocking the radiation at the wavelengths of sources 16 and 20.

Figure 10:
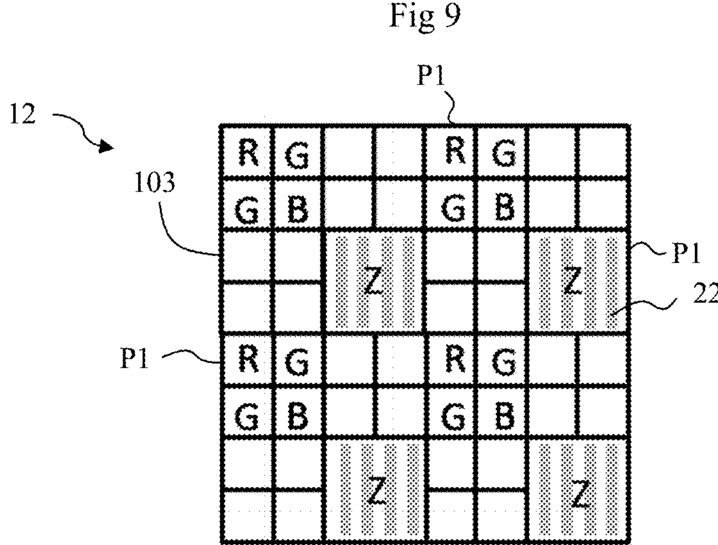
FIG. 10 is a simplified top view showing an example of arrangement of 2D pixels and of Z pixels of the image acquisition device of FIG. 9.

FIG. 10 is a simplified top view showing an example of arrangement of 2D pixels for the acquisition of a 2D color image and of Z pixels of the image acquisition device 12 of FIG. 9. The 2D pixels are arranged in a Bayer array, that is, in groups of four 2D pixels arranged in a square, having two diagonally-opposite 2D pixels respectively capturing a light radiation substantially of red (R) and blue (B) color, and having its two other diagonally-opposite pixels capturing a light radiation substantially of green color (G). The surface area in top view of a Z pixel substantially corresponds to the sum of the surface areas in top view of four 2D pixels.

Figure 11:
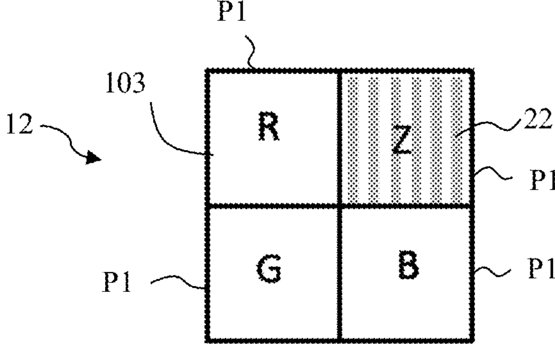
FIG. 11 is a simplified top view showing another example of arrangement of 2D pixels and of Z pixels of the image acquisition device of FIG. 9.

FIG. 11 is a simplified top view showing another example of arrangement of 2D pixels for the acquisition of a 2D color image and of Z pixels of the image acquisition device 12 of FIG. 9. The 2D pixels are arranged in a Bayer array, with the difference that a 2D pixel capturing a light radiation substantially of green color (G) is replaced with a Z pixel. The dimensions of a Z pixel substantially correspond to the dimensions of a 2D pixel.

Figure 12:
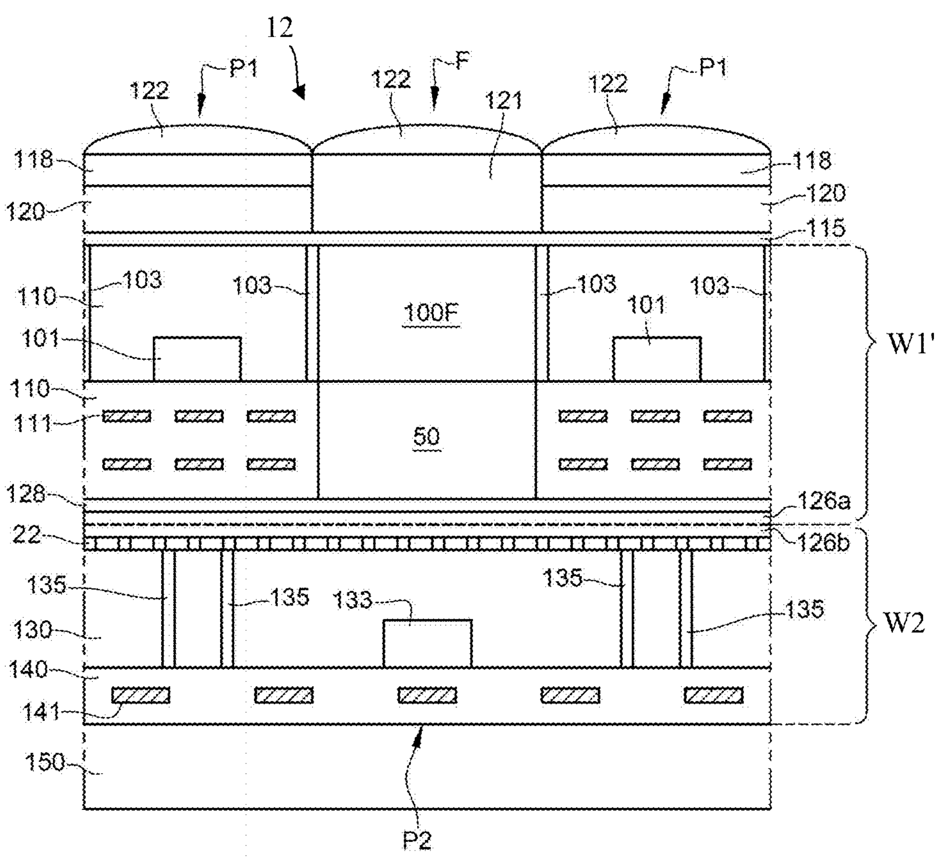
FIG. 12 is a cross-section view schematically and partially illustrating an embodiment of an image acquisition device of the system of FIG. 1 adapted to the acquisition of a 2D image and of an image of the estimated degree of polarization.

FIG. 12 is a cross-section view schematically and partially illustrating another embodiment of an acquisition device 12 comprising Z pixels and 2D pixels.

The device 12 of FIG. 12 comprises:

a first sensor W1' comprising a plurality of pixels P1 corresponding to 2D pixels and a plurality of windows F distributed across the sensor surface, the common elements between sensor W1' and the sensor W1 shown in FIG. 9 being indicated by the same references; and a second sensor W2 formed inside and on top of a second semiconductor substrate 130, for example, a single-crystal silicon substrate, sensor W2 being placed against the rear surface of sensor W1' and comprising a plurality of pixels P2 corresponding to Z pixels and respectively arranged in front of the windows F of sensor W1'.

The windows F of sensor W1' are transmissive in the emission range of light sources 16 and 20 so as to allow the detection of the returned light signal by the pixels P2 of sensor W2. As an example, the transmission coefficient of the windows F of sensor W1' in the emission wavelength range of light sources 16 and 20 is greater than 50%.

The returned light signal reflected by the scene is captured by the pixels P2 of sensor W2, to determine the estimated degree of polarization DOP' at different points of the scene. The pixels P1 of sensor W1' are capable of capturing the visible light emitted by the scene to form a 2D image of the scene. The windows F of sensor W1' are transmissive in the emission wavelength range of the light source to allow the detection of the returned light signal by the depth pixels P2 of sensor W2. As an example, the transmission coefficient of the windows F of sensor W1' in the emission wavelength range of the light source is greater than 50%.

In the shown example, the pixel P1 of sensor W1' comprises a photodiode 101 comprising one or a plurality of local implanted regions formed in semiconductor substrate 100. In this example, the implanted region(s) of photodiode 101 are arranged on the rear surface side of substrate 100. Each pixel P1 may further comprise one or a plurality of additional components (not shown), for example, control transistors, formed on the rear surface side of substrate 100, for example, in substrate 100 and on the rear surface of substrate 100. Sensor W1' further comprises an interconnection stack 110, formed of alternated dielectric and conductive layers coating the rear surface of substrate 100, having electric connection tracks and/or terminals 111 connecting the pixels P1 of the sensor to a peripheral control and power supply circuit, not shown.

In the shown example, sensor W1' comprises vertical insulation walls 103 crossing substrate 100 across its entire thickness and delimiting substrate portions 100F respectively corresponding to the different windows F of sensor W1'. Vertical insulation walls 103 particularly have an optical insulation function, and may further have an electrical insulation function. As an example, vertical insulation walls 103 are made of a dielectric material, for example, silicon oxide. Similar insulation walls may further be provided between the pixels P1 of sensor W1'.

In the shown example, the substrate 100 of sensor W1' comprises no local implanted region in the substrate portions 100F of the windows F of sensor W1', to maximize the transparency of the substrate in windows F.

According to an aspect of the embodiment of FIG. 12, each transmissive window F further comprises, on the rear surface side of substrate 130, an amorphous silicon region 50 located in front of the substrate portion 100F of window F. Region 50 is in contact, by its front surface, with the rear surface of substrate portion 100F, and extends over substantially the entire surface of window F. In this example, interconnection stack 110 is interrupted in front of each transmissive window F. Amorphous silicon region 50 is located in the interruption zone of interconnection stack 110. Amorphous silicon region 50 for example extends across substantially the entire thickness of interconnection stack 110. The thickness of amorphous silicon region 50 is for example substantially identical to that of interconnection stack 110, for example in the range from 3 to 15 μm, for example, from 5 to 10 μm.

Preferably, amorphous silicon region 50 is in contact, along its entire periphery and along substantially its entire height, with a material having a refraction index lower than that of amorphous silicon, for example, silicon oxide. Thus, the light originating from the substrate portion 100F of window F is vertically guided towards the underlying pixel P2.

Each window F for example has, in top view, dimensions substantially identical to the dimensions of the pixels P1 of sensor W1'. As an example, in top view, the largest dimension of each pixel P1 or window F of sensor W1' is smaller than 10 μm, for example, smaller than 5 μm, for example, smaller than 2 μm, for example, in the order of 1 μm.

In the shown example, the front surface of substrate 100 is coated with a passivation layer 115, for example, a silicon oxide layer, an $HfO_2$ layer, an $Al_2O_3$ layer, or a stack of a plurality of layers of different materials capable of having other functions than the passivation function only (antireflection, filtering, bonding, etc.), extending across substantially the entire surface of the sensor. As an example, layer 115 is arranged on top of and in contact with the front surface of substrate 100.

In the example of FIG. 12, sensor W1' is a 2D color image sensor, that is, it comprises pixels P1 of different types, adapted to measuring light intensities in distinct visible wavelength ranges. For this purpose, each pixel P1 comprises a color filter 118, for example, a colored resin layer, arranged on the front surface side of substrate 100. As an example, sensor W1' comprises three types of pixels P1, first pixels P1 called blue pixels, comprising a color filter 118 preferably transmitting blue light, second pixels P1 called red pixels, comprising a color filter 118 preferably transmitting red light, and third pixels P1 called green pixels, comprising a color filter 118 preferably transmitting green light. In FIG. 1, the different types of pixels P1 are not differentiated.

In the example of FIG. 12, each pixel P1 further comprises an infrared band-stop filter 120, for example, an interference filter or a resin layer letting through visible light and absorbing infrared radiation. Filter 120 is for example adapted to transmitting light at all wavelengths except for a wavelength range centered on the emission wavelength range of the light source. In this example, filter 120 is arranged on the front surface side of substrate 100, for example, on top of and in contact with the front surface of passivation layer 115, and extends over substantially the entire surface of each pixel P1. Color filter 118 is for example arranged on top of and in contact with the front surface of filter 120. Filter 120 enables to avoid for light originating from the light source and reflected by the scene to be detected by pixels P1 and to degrade the quality of the 2D image acquired by pixels P1. Filter 120 more generally enables to block infrared radiations to improve the rendering of the colors of the 2D image.

As a variant, sensor W1' may be a monochromatic 2D image sensor, in which case filters 118 may be omitted.

In the shown example, each window F of sensor W1' comprises a filter 121, for example, a resin filter and/or an interference filter, adapted to transmitting light in the emission wavelength range of the light source. Preferably, filter 121 is adapted to transmitting light only in a relatively narrow wavelength range centered on the emission wavelength range of the light source of the system, for example, a wavelength range having a width at half-maximum smaller than 30 nm, for example, smaller than 20 nm, for example, smaller than 10 nm. In this example, filter 121 is arranged on the front surface side of substrate 100, for example, on top of and in contact with the front surface of passivation layer 115, and extends over substantially the entire surface of window F. Filter 121 enables to avoid untimely startings of the photodiode of the underlying pixel P2 under the effect of a light radiation which does not originate from the light source of the system. In the example of FIG. 1, filter 121 is located at the level of the windows F of the sensor only.

Each pixel P1 of sensor W1' may further comprise a microlens 122 arranged on the front surface side of substrate 100, for example, on top of and in contact with the color filter 118 of the pixel, adapted to focusing the incident light onto the pixel photodiode 101.

Further, each window F of sensor W1' may comprise a microlens 122, arranged on the front surface side of substrate 100, for example, on top of and in contact with the filter 120 of the window.

In this example, the rear surface of sensor W1' is bonded to the front surface of sensor W2 by molecular bonding. For this purpose, sensor W1' comprises a layer 126*a*, for example, made of silicon oxide, coating its rear surface. Further, sensor W2 comprises a layer 126*b* of same nature as layer 126*a*, for example, made of silicon oxide, coating its front surface. The rear surface of layer 126*a* is placed into contact with the front surface of layer 126*b* to perform a molecular bonding of sensor W2 to sensor W1'. As an example, layer 126*a*, respectively 126*b*, extends continuously over substantially the entire surface of sensor W1', respectively W2.

In the shown example, sensor W1' further comprises, on its rear surface side, between interconnection stack 110 and layer 126*a*, a layer 128 of a material having a refraction index different from that of layers 126*a* and 126*b*, for example, a material having a refraction index greater than that of layers 126*a* and 126*b*, for example, silicon nitride. As an example, layer 128 continuously extends across substantially the entire surface of sensor W1'. Layer 126*a* is for example in contact, by its front surface, with the rear surface of layer 128.

Further, in this example, device 12 further comprises, on the front surface of sensor W2, between substrate 130 and layer 126*b*, rectilinear polarizer 22. As an example, rectilinear polarizer 22 continuously extends across substantially the entire surface of sensor W2.

In this example, the stack of layers 128-126*a*-126*b* forms an antireflection stack favoring the passage of light from each transmissive window F of sensor W1' to the photosensitive region of the underlying pixel P2.

Each pixel P2 of sensor W2 comprises a photodiode 133 formed in substrate 130, in front of the corresponding window F of sensor W1'. Photodiode 133 comprises one or a plurality of local semiconductor regions formed in semiconductor substrate 130. Each pixel P2 may further comprise one or a plurality of additional components (not shown), for example, control transistors, formed on the rear surface side of substrate 130, for example, in substrate 130 and on the rear surface of substrate 130. Sensor W2 further comprises an interconnection stack 140, formed of alternated dielectric and conductive layers coating the rear surface of substrate 130, in which are formed electric connection tracks and/or terminals 141 connecting the pixels P2 of the sensor to a peripheral control and power supply circuit, not shown.

In the shown example, in each pixel P2 of sensor W2, the pixel photodiode 133 is entirely surrounded with a vertical insulation wall 135 crossing substrate 130 across its entire thickness. Wall 135 particularly has an optical insulation function, and may further have an electrical insulation function. As an example, vertical insulation wall 135 is made of a dielectric material, for example, silicon oxide. As a variant, the vertical insulation wall 135 is a multilayer wall comprising an inner layer made of a dielectric material, for example, silicon oxide, one or a plurality of intermediate layers comprising at least one metal layer, and an outer layer made of a dielectric material, for example, silicon oxide.

In the shown example, the lateral dimensions of the detection areas of pixels P2 (delimited by walls 135) are greater than the lateral dimensions of transmissive windows F, which enables to release alignment constraints during the assembly of sensors W1' and W2. The described embodiments are however not limited to this specific case. As a variant, the lateral dimensions of the photosensitive regions of the detection areas of pixels P2 are substantially identical to those of transmissive windows F. In this case, vertical insulation wall 135 may be located substantially vertically in line with the vertical insulation wall 103 surrounding the substrate portion 100 of the corresponding window F of sensor W1'.

Walls 103 and 135, as well as the vertical guiding through amorphous silicon region 50 enable to limit the risk for light rays received by a pixel P1 next to window F to activate the SPAD photodiode of the corresponding pixel P2, which might result in an erroneous depth measurement.

The thickness of substrate 130 is for example in the range from 5 to 50 μm, for example, from 8 to 20 μm.

In the shown example, sensor W2 is bonded, by its rear surface, to a support substrate 150, for example, a silicon substrate. As a variant, support substrate may be replaced with an additional control and processing circuit (not shown) formed inside and on top of a third semiconductor substrate, for example, such as described in relation with FIG. 1 of the above-mentioned patent application EP3503192.

Figure 13:
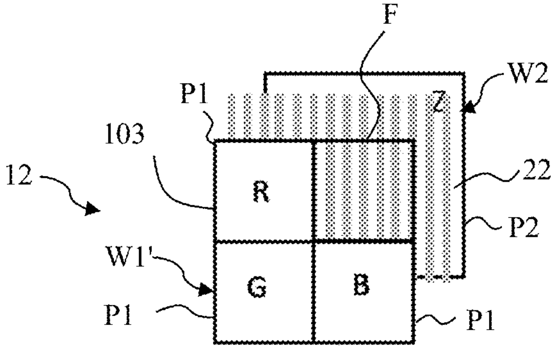
FIG. 13 is a simplified top view showing another example of arrangement of 2D pixels and of Z pixels of the image acquisition device of FIG. 12.

FIG. 13 is a simplified top view showing an example of arrangement of 2D pixels of sensor W1' for the acquisition of a 2D color image and of Z pixels of sensor W2 of the image acquisition device 12 shown in FIG. 12. The 2D pixels are arranged in a Bayer array, with the difference that a 2D pixel capturing a light radiation substantially of green color (G) is not present and is replaced with window F.

Figure 14:
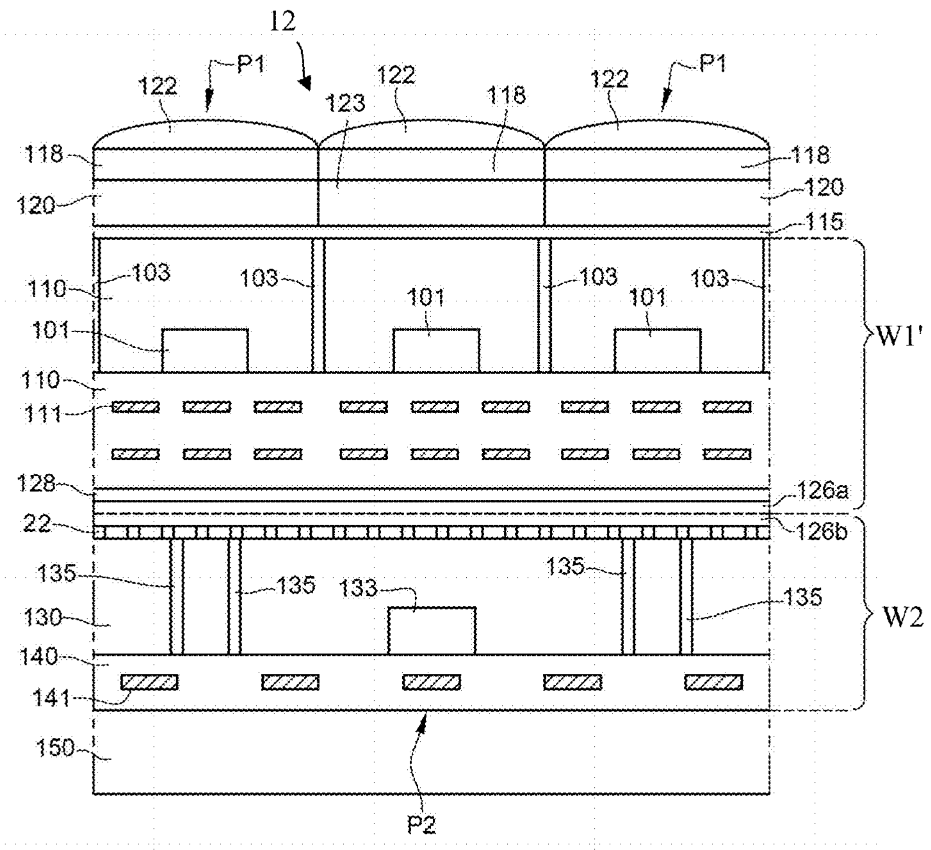
FIG. 14 is a cross-section view schematically and partially illustrating another embodiment of an image acquisition device of the system of FIG. 1 adapted to the acquisition of a 2D image and of an image of the estimated degree of polarization.

FIG. 14 is a cross-section view schematically and partially illustrating another embodiment of an acquisition device 12 comprising Z pixels and 2D pixels. The acquisition device 12 shown in FIG. 14 comprises all the elements of the acquisition device 12 shown in FIG. 12, with the difference that windows F are not present and are each replaced with a pixel P1 covered with a block 123 and with color filter 118. Block 123 is transparent to the radiation emitted by light sources 16 and 20 and is transparent to visible light. As a variant, all filters 120 are each replaced with block 123.

Figure 15:
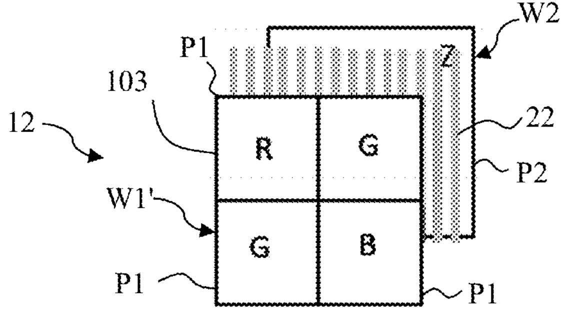
FIG. 15 is a simplified top view showing an example of arrangement of 2D pixels and of Z pixels of the image acquisition device of FIG. 14.

FIG. 15 is a simplified top view showing an example of arrangement of 2D pixels of sensor W1' for the acquisition of a 2D color image and of Z pixels of the sensor W2 of the image acquisition device 12 shown in FIG. 14. The 2D pixels are arranged in a Bayer array.

Various embodiments and variants have been described. Those skilled in the art will understand that certain features of these various embodiments and variants may be combined, and other variants will occur to those skilled in the art. Although, in the previously-described embodiments, second direction $\vec{y}$ is perpendicular to first direction $\vec{x}$, second direction $\vec{y}$ may be inclined with respect to first direction $\vec{x}$ by an angle different from 90°. Further, although, in the previously-described embodiments, the polarization direction of rectilinear polarizer 22 is parallel to direction $\vec{x}$, the polarization direction of rectilinear polarizer 22 may be inclined with respect to direction $\vec{x}$, while not being perpendicular to direction $\vec{x}$. Indeed, it is sufficient for the inclination angle of the polarization direction of rectilinear polarizer 22 with respect to direction $\vec{x}$ to be known, by the assembly of system 10 or by measurement, to be taken into account in the relations used for the determination of the estimated degree of polarization DOP'.

Finally, the practical implementation of the described embodiments and variants is within the abilities of those skilled in the art based on the functional indications given hereabove.

The invention claimed is:

1. System for determining an estimated degree of polarization of a radiation reflected by a scene, comprising:

a first light source of a first electromagnetic radiation modulated at a first frequency and rectilinearly polarized according to a first direction;

a second light source of a second electromagnetic radiation modulated at a second frequency greater than the first frequency and rectilinearly polarized according to a second direction non-parallel to the first direction; and a device of acquisition of an image of the radiation reflected by the scene comprising first pixels configured to capture the reflected radiation, each first pixel being covered with a linear polarizer according to a third direction non-perpendicular to the first direction;

wherein the second frequency is equal to twice the first frequency, the method further comprising the following steps:

the acquisition by the first pixels of $N_{tap}$ samples $I_k$ of charges photogenerated by detection of the reflected radiation during shifted time periods $T_{int}$, $N_{tap}$ being an integer number greater than or equal to five;

the determination of coefficients $a_n$ and $b_n$, n being an integer number varying from 1 to 2, according to the following relations:

$$\begin{cases} a_n = \frac{2}{N_{tap}} \frac{1}{\operatorname{sinc}\left(\frac{1}{2} n\omega T_{int}\right)} \sum_{k=0}^{N_{tap}-1} I_k \cos(n\omega k T_e) \\ b_n = \frac{2}{N_{tap}} \frac{1}{\operatorname{sinc}\left(\frac{1}{2} n\omega T_{int}\right)} \sum_{k=0}^{N_{tap}-1} I_k \sin(n\omega k T_e) \end{cases}$$

where ω is the pulse associated with the first frequency and where Te is the time period separating the beginnings of acquisitions of two successive samples;

the determination of coefficients $c_n$ according to the following relation:

$$c_n = \sqrt{a_n^2 + b_n^2}$$

the determination of the estimated degree of polarization DOP' according to the following relation:

$$DOP' = \frac{c_1 - c_2}{c_1 + c_2}.$$

2. System according to claim 1, wherein the third direction is identical to the first direction.

3. System according to claim 1, wherein the second frequency is a multiple of the first frequency.

4. System according to claim 3, wherein the second frequency is twice the first frequency.

5. System according to claim 1, wherein the first frequency is the range from 25 MHz to 100 MHz.

6. System according to claim 1, wherein the second direction is perpendicular to the first direction.

7. System according to claim 1, wherein the acquisition device comprises no other rectilinear polarizers than the rectilinear polarizers according to the third direction.

8. System according to claim 1, wherein the acquisition device is further configured to deliver a depth image of the scene.

9. System according to claim 1, wherein the acquisition device is further configured for the acquisition of a 2D image of the scene and comprises second 2D image pixels.

10. System according to claim 9, wherein the acquisition device comprises a stack of a first sensor comprising the second pixels and of a second sensor comprising the first pixels.

11. Method of determining an estimated degree of polarization of a radiation reflected by a scene, comprising the following steps:

emission by a first light source of a first electromagnetic radiation modulated at a first frequency and rectilinearly polarized according to a first direction;

emission by a second light source of a second electromagnetic radiation modulated at a second frequency greater than the first frequency and rectilinearly polarized according to a second direction non-parallel to the first direction; and acquisition by an acquisition device of an image of the radiation reflected by the scene, the acquisition device comprising first pixels configured to capture the reflected radiation, each first pixel being covered with a rectilinear polarizer according to a third direction non-perpendicular to the first direction;

wherein the second frequency is equal to twice the first frequency, the method further comprising the following steps:

the acquisition by the first pixels of $N_{tap}$ samples $I_k$ of charges photogenerated by detection of the reflected radiation during shifted time periods $T_{int}$, $N_{tap}$ being an integer number greater than or equal to five;

the determination of coefficients $a_n$ and $b_n$, n being an integer number varying from 1 to 2, according to the following relations:

$$\begin{cases} a_n = \frac{2}{N_{tap}} \frac{1}{\operatorname{sinc}\left(\frac{1}{2} n\omega T_{int}\right)} \sum_{k=0}^{N_{tap}-1} I_k \cos(n\omega k T_e) \\ b_n = \frac{2}{N_{tap}} \frac{1}{\operatorname{sinc}\left(\frac{1}{2} n\omega T_{int}\right)} \sum_{k=0}^{N_{tap}-1} I_k \sin(n\omega k T_e) \end{cases}$$ [Math 24]

where ω is the pulse associated with the first frequency and where Te is the time period separating the beginnings of acquisitions of two successive samples;

the determination of coefficients $c_n$ according to the following relation:

$$c_n = \sqrt{a_n^2 + b_n^2}$$

the determination of the estimated degree of polarization DOP' according to the following relation:

$$DOP' = \frac{c_1 - c_2}{c_1 + c_2}.$$ [Math 26]

* * * * *